Patented Dec. 17, 1940

2,225,506

UNITED STATES PATENT OFFICE 2,225,506

METHOD OF PREPARING SOLUBLE CASEINATES

Herbert E. Otting, Westerville, Ohio, assignor to M & R Dietetic Laboratories, Inc., a corporation of Ohio No Drawing. Application October 31, 1938, Serial No. 237,889

12 Claims. (Cl. 260—120)

This invention relates to improvements in the preparation of pure soluble caseinates and the resulting products and also in methods of preparing casein.

Soluble caseinates, as heretofore made by dissolving casein in an aqueous alkaline solution, are of high ash content and alkalinity. Such caseinates are comparatively impure and contain excessively large proportions of calcium and phosphates and their uses, both industrially and in edible products, are thereby limited.

I have found that a pure readily soluble caseinate having reduced proportions of calcium and phosphates and other desirable properties such as low ash, improved flavor, etc. can be prepared by treating casein with base exchange materials, such as the base exchange silicates, or suitably activated normally inert adsorptive materials. In accordance with my present invention, the normally insoluble casein, regardless of the manner formed, preferably in finely subdivided form and dispersed or suspended in water or other aqueous vehicle substantially free from calcium and phosphates, is brought into contact with the base exchange material in any suitable manner, as hereinafter described. The contact treatment converts the insoluble casein into a soluble caseinate (sodium and/or potassium caseinate) of low ash content and having relatively low proportions of calcium and phosphates. The extent of reduction of the ash content and both of CaO and P₂O₅ may be controlled by regulating the proportion of base exchange material to the casein and the time of contact.

As the base exchange materials in accordance with my present invention, I may, for example, use zeolites, glauconite and artificial zeolitic materials, such as those commonly known in the trade as "Permutit," "Refinite," "Crystallite," etc. I may also use activated normally inert adsorptive materials, for example, silica gel, hydrated silica, fullers' earth or the like, which have been activated by suitable treatment with an alkali and/or a solution of an alkali metal halide as fully described in my Patent No. 2,045,097, granted June 23, 1936. Both the base exchange silicates and activated normally inert adsorptive materials will hereinafter be referred to, for convenience, as "base exchange materials."

The casein to be treated in accordance with my invention may be obtained, for example, by precipitation from skim milk by the usual method, as, by means of acid, enzymes or combinations thereof. The precipitated casein is separated, as by draining off the whey, and is washed one or more times with water to free it from the residual whey and other foreign matter. The acid used may be either a mineral acid or an organic acid, such as hydrochloric, sulphuric, lactic, citric or the like acid. I prefer, however, to use a citric acid precipitated casein, since the soluble caseinate obtained therefrom in accordance with my invention has better working properties, particularly, when used in food products as a body-forming or colloidal dispersing agent.

In carrying out the process of my invention, the casein preferably in aqueous suspension is contacted with the base exchange material. I prefer, however, to first macerate or subdivide the casein into fine particle form by the aid of a colloid mill, homogenizer or similar apparatus in a manner well-known in the art. Thus, I may mix the casein with a small amount of water and force the mixture through a positive pressure pump, such as one known in the art as the "bump pump," to form a dispersion of finely subdivided particles of casein.

The aqueous dispersion of casein is then contacted with the base exchange material in any suitable manner, in batch or continuous operation. Thus, the casein suspension may be charged into a vessel with a suitable quantity of the fine, grained base exchange material, and the mixture agitated by means of a suitable agitator or by rotation of the vessel or container; or the suspension may be passed downwardly or upwardly through a bed of the base exchange material, provided with agitators that agitate or stir the bed of base exchange material at intervals. On contact of the casein with the base exchange material, the former is converted into a caseinate and dissolves in the medium in which it is suspended. I have found that conversion and solution of the casein take place more readily at temperatures slightly higher than normal room temperature and hence I provide suitable heating means to heat the bed of base exchange material to about 100° F. or slightly higher. If desired, the finely divided aqueous suspension of casein may be preliminarily heated prior to passage through the bed of base exchange material to aid in effecting solution of the casein solubilized during passage through the bed. It may also be advisable, at times, to acidify the suspension of casein slightly before contacting with the base exchange material, the acidity thereof being preferably not above 0.2% (calc. as lactic acid). However, acidification is in general not required.

The solution of the caseinate formed as above described passes outwardly from the bed of base exchange material. The solution may be used as such for incorporation into other materials, or for other purposes, or it may be dried in any desirable manner as by spray drying and stored or used in dry form.

The caseinates produced in accordance with the present invention are of a high degree of purity, and are very low in inorganic constituents, as indicated by their low ash. They are particularly low in the proportions of calcium and phosphorus present. Furthermore, they very closely approximate neutrality in their reaction.

The following example illustrates the invention and the character of the caseinate produced thereby.

Fresh milk was acidified with citric acid to form a curd, from which the whey was drained. The resulting curd was washed and subsequently dispersed in water. The amount of water used is not material; obviously, not more than is necessary to secure a suspension need be employed. Thus I find that 80% of water by weight is satisfactory.

The resulting suspension is then contacted with a suitable base exchange material. Any of the base exchange materials of the character heretofore indicated may be employed, the proportion required varying, of course, with the specific character of the base exchange material employed. Thus, with a material of the character of the commercial product known as "Crystallite" of 30 to 60 mesh, I find it satisfactory to use about 9 parts of the base exchange material to 1 part by weight of the casein.

The suspension of casein is thoroughly admixed with the base exchange material and the particles rapidly become soluble and are dissolved in the aqueous medium. The resulting solution of sodium caseinate is separated from the base exchange material and may then be concentrated or dried in any suitable manner, preferably at low temperatures and under vacuum in order to avoid any material change in the characteristics of the material. Thus, the solution may be dried by the atmospheric roller drying process, vacuum roller drum drying process, spray-drying process or the like.

The resulting caseinate is found to be very low in inorganic matter, and particularly in calcium and phophorus. In the case illustrated, it was found to have the following analysis:

| | Per cent |
|---|---|
| Moisture | 6.93 |
| Protein (moisture-free basis) | 89.94 |
| Ash | 5.03 |
| CaO | 0.151 |
| $P_2O_5$ | 1.87 |

It will be noted from the above analysis, that the inorganic constituents or ash remaining after substracting the proportions of calcium oxide and phosphorus pent-oxide amounts to 3.01%.

For purposes of comparison, a caseinate was produced by the usual method of treatment with a solution of sodium hydroxide, from curd produced in the same manner and from the same milk as referred to in the example heretofore given. Only sufficient alkali was employed to effect solution of the casein. The resulting alkali caseinate, after drying in the same manner as that used in the previous example, shows the following analysis.

| | Per cent |
|---|---|
| Moisture | 6.53 |
| Protein (moisture-free basis) | 82.86 |
| Ash | 13.40 |
| CaO | 0.620 |
| $P_2O_5$ | 5.50 |

It will be noted that in the case of the caseinate thus produced by the conventional methods, the proportion of inorganic constituents after substracting the calcium oxide and phosphorus pentoxide amounted to 7.28%. Since the inorganic constituents other than the calcium oxide and phosphorus pentoxide include the alkali metal introduced into the casein molecule to effect formation of the soluble caseinate, it will be apparent from this comparison that in the case of the product prepared in accordance with the present invention, a very substantially smaller amount of alkali metal has been involved in the reaction. It will be noted that the total ash content of the product prepared in accordance with the present invention is less than half that of the product made by the conventional alkali solution method; the calcium oxide content approximately one-fourth and the phosphorus pentoxide content substantially less than one-half.

It has also been found that the alkali caseinate produced by the present invention is much more nearly neutral than that produced by the conventional alkali solution method. Thus the pH of a 5% solution of alkali caseinate produced by the conventional alkali solution method as above described was 7.65, while that of the caseinate produced in accordance with the present invention was 7.02. It will be observed that this is consistent with the extremely low proportion of inorganic constituents (not calcium and phosphorus oxides) found in the caseinate produced by the process of the present invention.

The sodium caseinate produced in accordance with the present invention may in turn be converted into a casein by a precipitation from aqueous solution by a suitable acid, for example, by trichloracetic acid. In one respect the resulting casein differs markedly from pure casein as experimentally produced; namely, in its low phosphorus content. Pure casein, as heretofore produced experimentally from milk, is reported as containing 0.85% of phosphorus (Davies, Dairy Chemistry, page 113). The casein produced in the manner described from sodium caseinate formed in accordance with the present invention shows on analysis 0.126% of phosporus pentoxide, which is the equivalent of 0.055% of phosphorus. The casein produced as above described from caseinate prepared in accordance with the present invention, does not show a determinable proportion of calcium, in this respect being similar to the pure casein reported by Davies.

In general, the characteristics of the caseinate produced in accordance with the present invention are its extremely low ash content; its extremely low content of phosphorus and its extremely low content of inorganic constituents other than calcium and phosphorus. In general, its ash content is found to be not above 10% and is usually in the range of 2 to 7%. Its content of calcium, determined as calcium oxide, is in general not over 0.25% and is usually in the range of 0.1 to 0.2%. Its content of phosphorus pentoxide is in general not over 3.5% and is usually in the range of 1 to 2½%. The casein produced from it is practically free from calcium and is extremely low in its phosphorous content, ranging from 0.02% to 0.30%, and being usually in the range of 0.025 to 0.15%.

After use in accordance with the present invention, the base exchange material may be revivified in any desirable manner for reuse as described above. For example, the spent material may be revivified by successive treatments with alkali metal hydroxides and an alkali metal halide as described in Patent No. 1,954,769, granted April 10, 1934, to John F. Lyman. I prefer, however to revivify the spent material in accordance with the methods described in Patent No. 2,072,903, granted March 9, 1937 to myself and Edwin H. Browne, or in Patent No. 2,102,642, granted December 21, 1937, to myself, Edwin H. Browne and Maurice E. Hull.

By preliminarily treating the base exchange material before contacting it with the casein suspension so as to introduce into the base exchange material potassium as the alkali metal or both potassium and sodium, the casein may be converted into the soluble potassium caseinate or into a mixed soluble potassium and sodium caseinate. The caseinates thus produced have the same properties with respect to their low content of inorganic constituents, alkali metal as well as calcium and phosphorus as does the product heretofore described.

It is understood that the base exchange material, whether fresh or revivified, will be preliminarily washed with water to remove any excess alkali or other water soluble compounds present as a result of any preliminary treatment or revivification process which may have been applied to the base exchange material. Whether the product is to be employed in the production of foods or for other commercial purposes, it is obviously important to maintain the base exchange material in sterile condition to avoid bacterial or other infection with resulting deleterious action upon the casein.

The soluble caseinate prepared in accordance with the present invention is particularly suitable for use in food products, such as ice cream, ice cream mixes, and as an emulsifying agent, for example, as in mayonnaise and other salad dressings and the like by reason of its great purity and marked freedom from undesirable flavors which normally result from the treatment of casein with alkalies to render it soluble. The caseinate and the casein produced from it, because of their great purity and low ash content, are likewise highly suited to many commercial uses, such as the preparation of special adhesives, of filaments for use in the preparation of artificial wool and the like.

Although the present invention has been described in connection with the specific details of an embodiment thereof, it is not intended that these shall be regarded as limitations upon the scope of the invention, except insofar as included in the accompanying claims.

I claim:

1. The method of forming a water soluble caseinate low in ash which comprises contacting casein with an active base exchange material.

2. The method of forming a water-soluble caseinate low in ash which comprises sub-dividing casein into small particles and contacting the sub-divided casein with an active base exchange material.

3. The method of forming a water-soluble caseinate low in ash which comprises contacting casein suspended in an aqueous medium substantially free from calcium and phosphates with an active base exchange material.

4. The method of forming a water soluble caseinate low in ash which comprises flowing casein suspended in an aqueous medium substantially free from calcium and phosphates through a bed of active base exchange material while agitating the bed.

5. The method of forming an aqueous solution of a caseinate which comprises contacting casein suspended in an aqueous medium substantially free from calcium and phosphates with an active base exchange material to convert the casein to a water-soluble caseinate whereby the caseinate dissolves in the aqueous medium to form the solution.

6. The method of forming an aqueous solution of a caseinate which comprises contacting casein suspended in an aqueous medium substantially free from calcium and phosphates with an active base exchange material while maintaining a temperature within the material in the order of about 100° F. to convert the casein to a water-soluble caseinate and cause the latter to dissolve in the aqueous medium.

7. The method of forming an aqueous solution of a caseinate which comprises contacting casein suspended in an aqueous medium substantially free from calcium and phosphates with an active base exchange material while maintaining a temperature within the material in the order of about 100° F. to convert the casein to a water-soluble caseinate and cause the latter to dissolve in the aqueous medium and agitating said active base exchange material during said contact.

8. The method of forming a dry water-soluble caseinate which comprises contacting casein suspended in an aqueous medium substantially free from calcium and phosphates with an active base exchange material to convert the casein to a water-soluble caseinate and cause the latter to dissolve in the aqueous medium, removing the resulting solution of the caseinate from said active base exchange material and drying said solution.

9. The method of forming a dry water-soluble caseinate which comprises contacting casein suspended in an aqueous medium substantially free from calcium and phosphates with an active base exchange material while agitating the material to convert the casein to a water-soluble caseinate and cause the latter to dissolve in the aqueous medium, removing the resulting solution of the caseinate from said active base exchange material and drying said solution.

10. The method of forming a comparatively pure casein which comprises contacting casein suspended in an aqueous medium substantially free from calcium and phosphates with an active base exchange material to convert the casein into a water-soluble caseinate and cause the latter to dissolve in the aqueous medium, removing the resulting solution of the caseinate from said active base exchange material and precipitating casein from said solution.

11. The method of forming a water soluble caseinate intended for use in edible products which comprises precipitating casein from a liquid milk product by means of citric acid, separating the casein and then contacting it with an active base exchange material.

12. The method of forming a water soluble caseinate intended for use in edible products which comprises precipitating casein from skim milk by means of citric acid, separating the casein and dispersing it in an aqueous medium substantially free from calcium and phosphates and contacting the aqueous dispersion of casein with an active base exchange material.

HERBERT E. OTTING.